(12) United States Patent
Matsubara

(10) Patent No.: US 7,716,308 B2
(45) Date of Patent: May 11, 2010

(54) SERVER, CLIENT, AND METHOD OF STORING SHARED TEXT DATA

(75) Inventor: Akio Matsubara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 321 days.

(21) Appl. No.: 11/820,577

(22) Filed: Jun. 19, 2007

(65) Prior Publication Data

US 2007/0294375 A1    Dec. 20, 2007

(30) Foreign Application Priority Data

Jun. 20, 2006    (JP)    ............... 2006-170082

(51) Int. Cl.
     *G06F 15/173*    (2006.01)
(52) U.S. Cl. ................................................. 709/219
(58) Field of Classification Search ................. 709/219
See application file for complete search history.

(56) References Cited

U.S. PATENT DOCUMENTS 7,239,635 B2 *   7/2007   Ozguner ..................... 370/392

FOREIGN PATENT DOCUMENTS

| EP | 0 501 760 A2 | 9/1992 |
|---|---|---|
| JP | 04-286065 | 10/1992 |
| JP | 10-031668 | 2/1998 |
| JP | 2003-281149 | 10/2003 |

OTHER PUBLICATIONS

Kazunori Yamaguchi, "9.2 Attribute", The UNIX Super Text (Part 1), Gijutsu-Hyohron Co., Ltd., 9 pages.

* cited by examiner

*Primary Examiner*—David Y Eng
(74) *Attorney, Agent, or Firm*—Blakely, Sokoloff, Taylor & Zafman LLP

(57) ABSTRACT

A server deletes a mask object in a structured text as a part of a shared text. A client issues a mask object constituting each layout object of the structured text, according to the authority of the client, and adds the mask object to the shared text data from which the mask object received from the server is deleted. With this arrangement, information written in the shared text is made unreadable according to the authority of the user of the client, thereby achieving access control to a part of the shared text.

12 Claims, 14 Drawing Sheets

FIG. 3
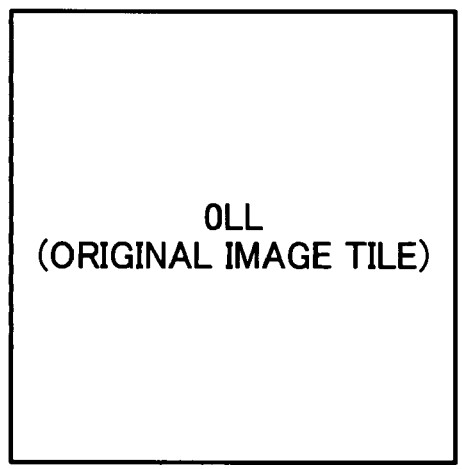
DECOMPOSITION
LEVEL #0
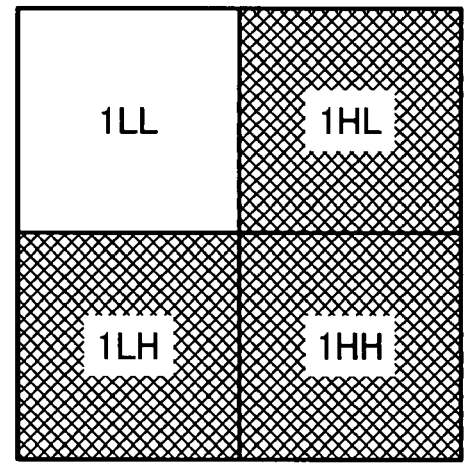
DECOMPOSITION
LEVEL #1
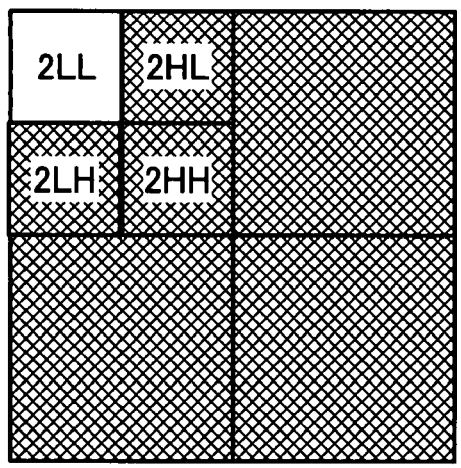
DECOMPOSITION
LEVEL #2
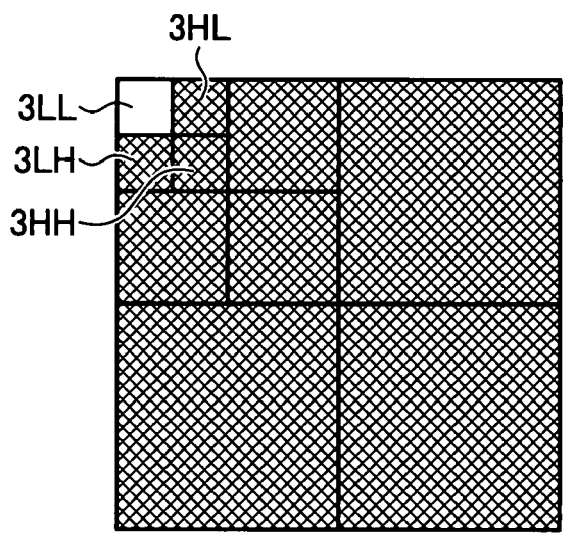
DECOMPOSITION
LEVEL #3

SERVER, CLIENT, AND METHOD OF STORING SHARED TEXT DATA

PRIORITY

The present application claims priority to and incorporates by reference the entire contents of Japanese priority document, 2006-170082, filed in Japan on Jun. 20, 2006.

BACKGROUND OF THE INVENTION

1. Field of the Invention

The present invention relates to technology for storing shared text data encoded in a structured document format.

2. Description of the Related Art

As an access control technique of a shared resource for access controlling a text shared by plural users according to an organization rule and authority of a user, there is available a technique used in a general-purpose operating system such as the UNIX (registered trademark) (for example, see The UNIX Super Text (Part 1), p. 96 "9.2 Attribute", Edited by Kazunori YAMAGUCHI, Gijutsu-Hyohron Co., Ltd.). The access control technique used in the UNIX has the following advantages. In a file present in the UNIX control of various kinds of operations including (1') execution, (2') reading, and (3') writing can be set to each of (1) the owner, (2) other users included in the group to which the owner belongs, and (3) other users. Therefore, this access control technique is used in the access control of the file management system.

However, the technique described above is only one of access controlling techniques in a file unit. Accordingly, when one file has many pages or is a large-scale file such as a file including a shared text prepared by a group, a shared translation, a shared preparation of a text, and preparation of a house design drawing, as often observed in the recent office environment, even when each person in charge needs to access control a page or a position (area) for which this person is responsible, the person can access control in only the file unit.

Consequently, based on the above technique, each user cannot access control a part of a large volume of pages or a part of a large-scale image, and the technique cannot satisfy the user's requirement.

SUMMARY OF THE INVENTION

A server, client, and method of storing shared text data are described. In one embodiment, a server that stores therein shared text data encoded in a structured document format, and that is connected to a plurality of clients, the server comprises a structure analyzing unit that performs structure analysis of the shared text data, a position-and-length specifying unit that specifies a position and a length of a codestream of a mask object as one of objects structuring each layout object of a structured text based on a result of the structure analysis of the shared text data, a deleting unit that deletes a codestream of the mask object, an updating unit that updates reference information to refer a codestream of the mask object deleted by the deleting unit, and an outputting unit that outputs the shared text data updated by the updating unit to an access-requested client.

DESCRIPTION OF THE DRAWINGS

FIG. 3 is a schematic diagram for illustrating a sub-band of each decomposition level when the number of decomposition level is three;

DETAILED DESCRIPTION OF THE PREFERRED EMBODIMENTS

Figure 1:
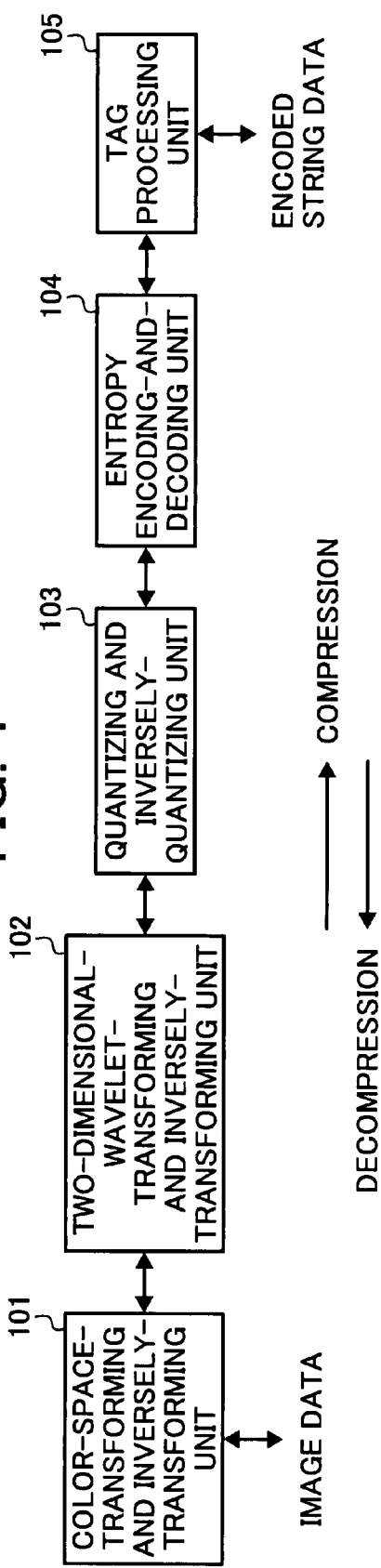
FIG. 1 is a functional block diagram of a system that achieves a hierarchical endocing algorithm as a basis of an encoding and decoding system based on a discrete wavelet transform which is the assumption of the present invention.

According to an embodiment of the present invention, a server that stores therein shared text data encoded in a structured document format, and that is connected to a plurality of clients includes a structure analyzing unit that performs structure analysis of the shared text data; a position-and-length specifying unit that specifies a position and a length of a codestream of a mask object as one of objects structuring each layout object of a structured text based on a result of the structure analysis of the shared text data; a deleting unit that deletes a codestream of the mask object; an updating unit that updates reference information to refer a codestream of the mask object deleted by the deleting unit; and an outputting unit that outputs the shared text data updated by the updating unit to an access-requested client.

According to another embodiment of the present invention, a server that stores therein shared text data encoded in a structured document format, and that is connected to a plurality of clients includes a structure analyzing unit that performs structure analysis of the shared text data; a position-and-length specifying unit that specifies a position and a length of a codestream of a mask object as one of objects structuring each layout object of a structured text based on a result of the structure analysis; an updating unit that updates at least a length of a codestream of the mask object; and an outputting unit that outputs the shared text data updated by the updating unit to an access-requested client.

According to still another embodiment of the present invention, a client that is connected to a server and that observes shared text data encoded in a structured document format stored in the server includes an authenticating unit that checks authority of a user; a mask issuing unit that issues a mask object as one of objects constituting each layout object of a shared text according to the authority of the user; a structure analyzing unit that performs structure analysis of the shared text data from which a codestream of the mask object received from the server is deleted; an adding unit that adds the codestream of the mask object issued by the mask issuing unit to the shared text data from which the codestream of the mask object received from the server is deleted based on a result of the structure analysis; an updating unit that updates reference information to refer the codestream of the mask object added by the adding unit; and an outputting unit that outputs the shared text data updated by the updating unit.

According to still another embodiment of the present invention, a method of storing shared text data encoded in a structured document format in a server that is connected to a plurality of clients includes performing a structure analysis of the shared text data; specifying a position and a length of a codestream of a mask object as one of objects structuring each layout object of a structured text based on a result of the structure analysis of the shared text data; deleting a codestream of the mask object; updating reference information to refer the deleted codestream of the mask object; and outputting updated shared text data to an access-requested client.

According to still another embodiment of the present invention, a method of storing shared text data encoded in a structured document format in a server that is connected to a plurality of clients includes performing structure analysis of the shared text data; specifying a position and a length of a codestream of a mask object as one of objects structuring each layout object of a structured text based on a result of the structure analysis; updating at least a length of a codestream of the mask object of which position and length are specified at the specifying; and outputting the shared text data updated at the updating.

According to still another embodiment of the present invention, a method of observing shared text data encoded in a structured document format stored in the server from a client includes checking authority of a user; issuing a mask object as one of objects constituting each layout object of a shared text according to the authority of the user; performing structure analysis of the shared text data from which a codestream of the mask object received from the server is deleted; adding the codestream of the mask object issued at the issuing to the shared text data from which the codestream of the mask object received from the server is deleted based on a result of the structure analysis; updating reference information to refer the codestream of the mask object added at the adding; and outputting the shared text data updated at the updating.

The above and other embodiments, features, advantages and technical and industrial significance of this invention will be better understood by reading the following detailed description of presently preferred embodiments of the invention, when considered in connection with the accompanying drawings.

An outline of "hierarchical encoding algorithm" and "encoding and decoding algorithm based on the discrete wavelet transform" which is the assumption of the present invention is explained first. A representative example of the "encoding and decoding algorithm based on the discrete wavelet transform" is "JPEG2000 algorithm".

FIG. 1 is a functional block diagram of a system that achieves a hierarchical encoding algorithm as a basis of an encoding system based on a discrete wavelet transform. This system functions as an image compressing unit, and includes function blocks of a color-space-transforming and inversely-transforming unit 101, a two-dimensional-wavelet-transforming and inversely-transforming unit 102, a quantizing and inversely-quantizing unit 103, an entropy encoding-and-decoding unit 104, and a tag processing unit 105.

One of the largest differences between this system and the conventional JPEG algorithm is a transform system. While the JPEG uses the discrete cosine transform (DCT), according to the hierarchical encoding algorithm, the two-dimensional-wavelet-transforming and inversely-transforming unit 102 uses a discrete wavelet transform (DWT). The DWT has an advantage over the DCT in that image quality in the high-compression area is satisfactory. This point is one of the largest reasons for the employment of the DWT in the JPEG2000 as the JPEG succeeding algorithm.

The other large difference is that, according to the hierarchical encoding algorithm, a function block of the tag processing unit 105 is additionally provided to form a code at the last stage of the system. The tag processing unit 105 generates compressed data as code string data during an image compression operation. During an image decompression operation, the tag processing unit 105 interprets code string data necessary for the decompression. Based on the code string data, the JPEG2000 makes it possible to achieve various convenient functions. For example, the JPEG2000 makes it possible to freely stop compression and decompression operations of a still image in an optional hierarchy (a decomposition level) corresponding to an octave division of the DWT in a block basis (see FIG. 3 described later). A low-resolution image (a compressed image) can be decompressed or a part of an image (a tiling image) can be decompressed from one file.

In many cases, the color-space-transforming and inversely-transforming unit 101 is connected to an input and output part of the original image. For example, this corresponds to a part in which a color system is transformed to or inversely transformed to YUV or YCbCr color system from the RGB display system including R (red)/G (green)/B (blue) components of the primary color system or from the YMC color display system including Y (yellow)/M (magenta)/C (cyan) of the complementary color system.

Figure 2:
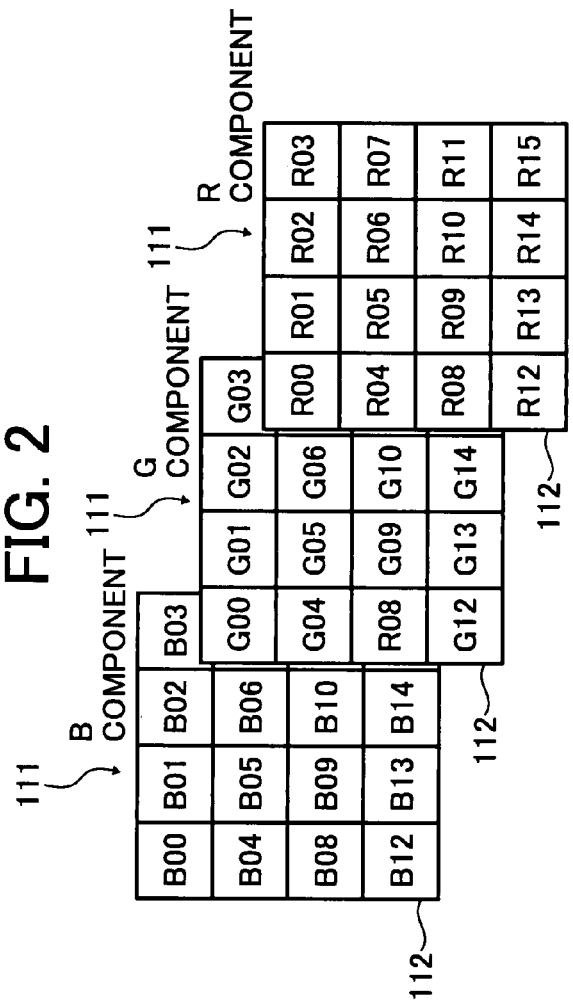
FIG. 2 is a schematic diagram for illustrating a divided rectangular area of each component of an original image.

The JPEG2000 algorithm is explained next. In general, a color image has each component 111 of an original image (the RGB primary color system in this case) divided into rectangular areas, as shown in FIG. 2. This divided rectangular area is generally called a block or a tile. In the JPEG2000, this rectangular area is generally called a tile. Therefore, this divided rectangular area is hereinafter called a tile (in the example shown in FIG. 2, each component is divided into 16 rectangular tiles 112, including 4×4 components). These individual tiles 112 (R00, R01, . . . , R15/G00, G01, . . . , G15/B00, B01, . . . , B15, in the example shown in FIG. 2) are basic units in executing the compression and decompression process of the image data. Accordingly, the compression and decompression operation of the image data is independently performed for each component or for each tile 112.

At the time of encoding image data, data of each tile 112 of each component 111 is input to the color-space-transforming and inversely-transforming unit 101. After the color space transform is performed, the two-dimensional-wavelet-transforming and inversely-transforming unit 102 executes a two-dimensional wavelet transform (a sequential transform), and space-divides the data into frequency bands.

FIG. 3 depicts a sub-band of each decomposition level when the number of decomposition level is three. In other words, a tile original image (0LL) (a decomposition level is 0) obtained by tile division of the original image is two-dimensionally wavelet transformed, thereby dividing the data into sub-bands (1LL, 1HL, 1LH, 1HH) shown in a decomposition level 1. The low-frequency component 1LL in this hierarchy is two-dimensionally wavelet transformed, thereby dividing the data into sub-bands (2LL, 2HL, 2LH, 2HH) shown in a decomposition level 2. The low-frequency component 2LL is similarly sequentially two-dimensionally wavelet transformed, thereby dividing the data into sub-bands (3LL, 3HL, 3LH, 3HH) shown in a decomposition level 3. In FIG. 3, a sub-band to be encoded in each decomposition level is meshed. For example, when the number of decomposition level is three, the meshed sub-bands (3HL, 3LH, 3HH, 2HL, 2LH, 2HH, 1HL, 1LH, 1HH) are encoded, and the 3LL sub-band is not encoded.

Next, bits to be encoded are determined in the assigned encoding sequence. The quantizing and inversely-quantizing unit 103 shown in FIG. 1 generates a context from bits around the encoded bits.

Figure 4:
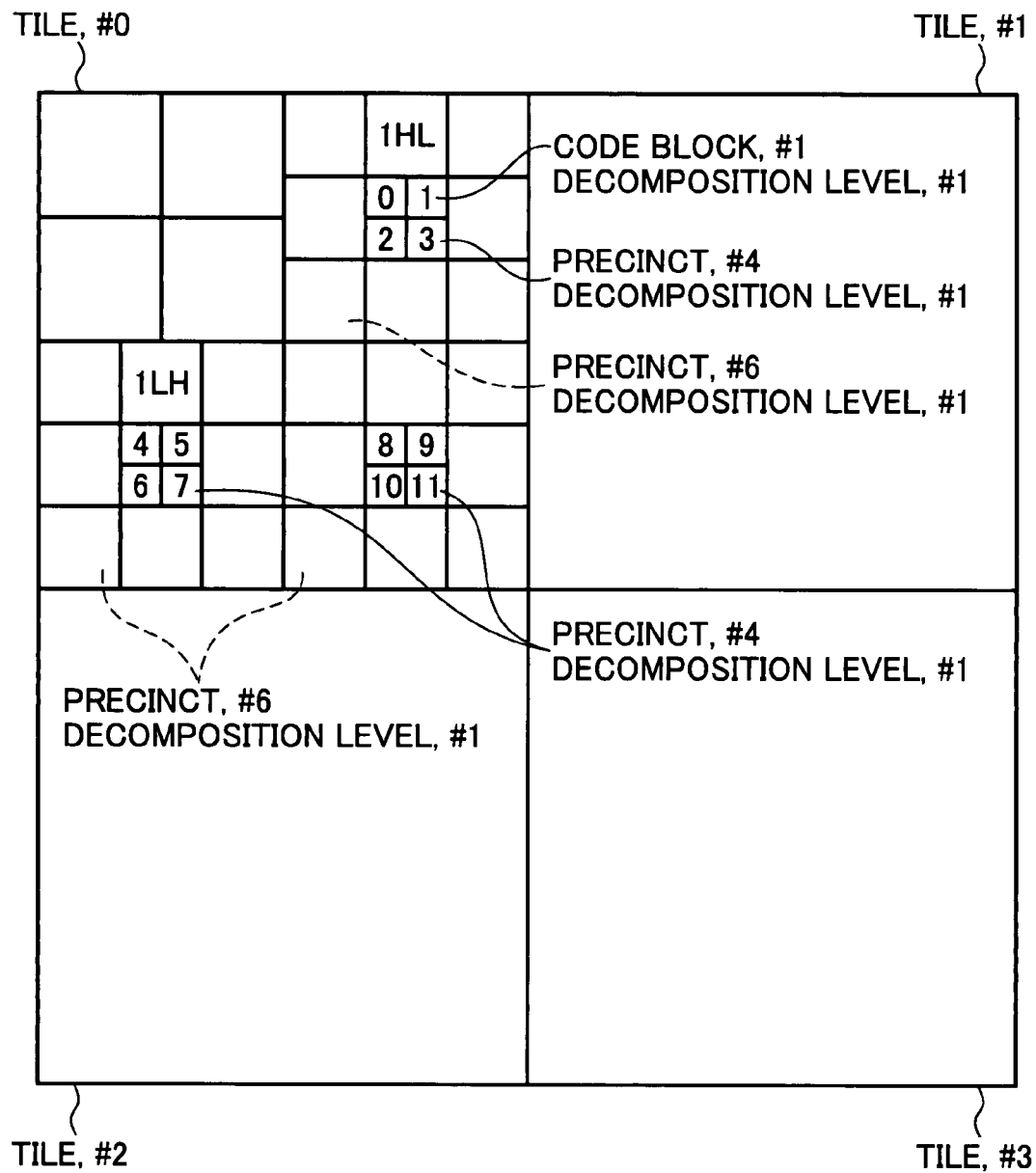
FIG. 4 is a schematic diagram for illustrating a precinct.

The quantized wavelet coefficients are divided into non-redundant rectangles called "precinct" for each sub-band. This is introduced to efficiently use the memory in the implementation. As shown in FIG. 4, one precinct includes spatially-coincided three rectangular areas. Each precinct is divided into non-redundant rectangular "code blocks". The code blocks are basic units for performing an entropy coding.

Coefficient values after wavelet transform can be directly quantized and encoded. To increase encoding efficiency, according to the JPE2000, coefficient values are disassembled into "bit plane" units, and orders can be set to the "bit planes" for each pixel or each code block.

Figure 5:
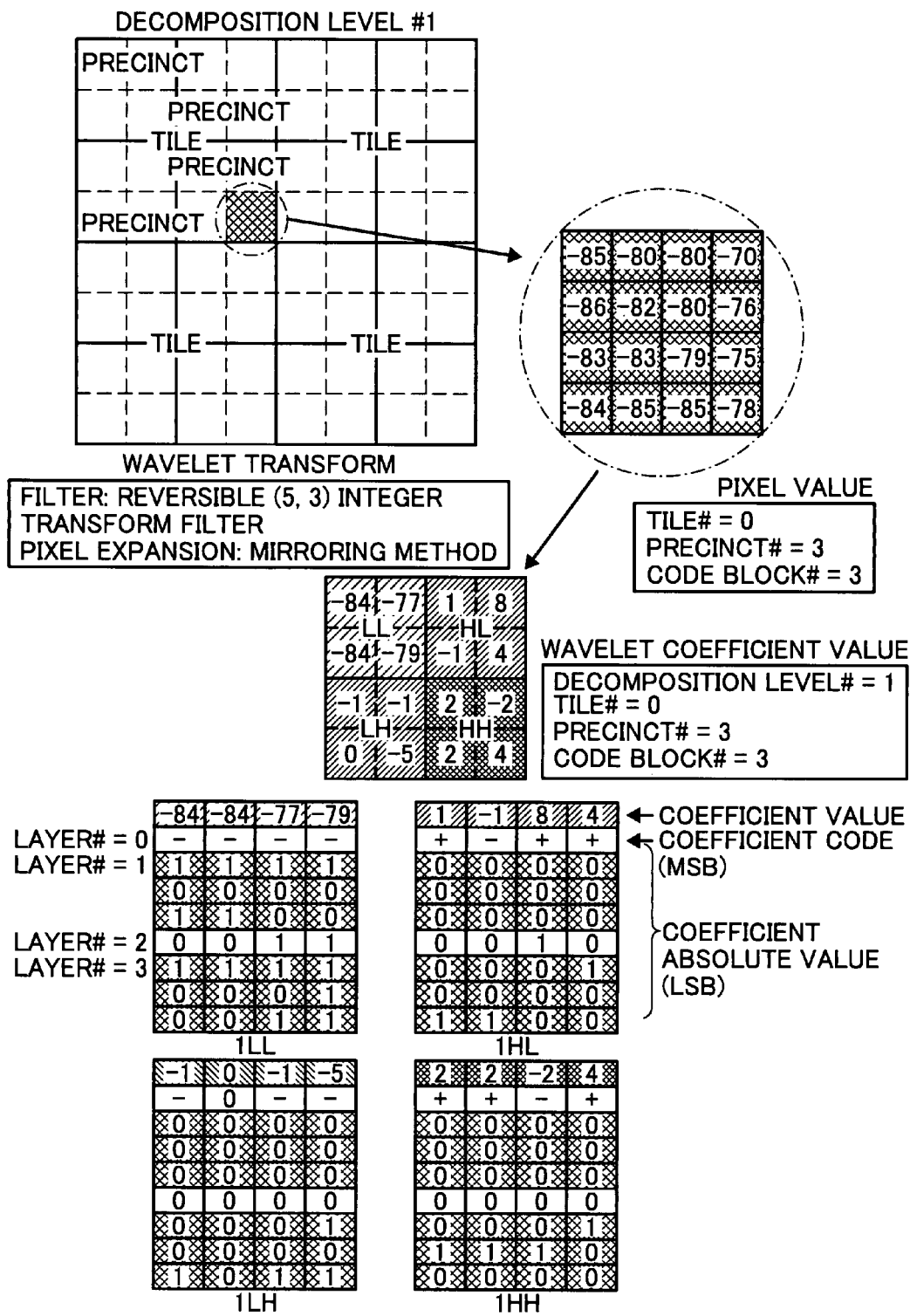
FIG. 5 is a schematic diagram for illustrating one example of a procedure of setting orders to bit planes.

FIG. 5 is a schematic diagram for illustrating one example of a procedure of setting orders to bit planes. As shown in FIG. 5, an original image (32×32 pixels) are divided into four tiles each including 16×16 pixels. Sizes of the precinct and the code block of the decomposition level 1 are 8×8 pixels and 4×4 pixels, respectively. Numbers of precincts and code blocks are set in the order of raster. In the present example, numbers 0 to 3 are allocated to precincts, and numbers 0 to 3 are allocated to code blocks. A mirroring method is used for the image expansion outside a tile boundary. A wavelet transform is performed using a reversible (5, 3) filter, thereby obtaining a wavelet coefficient value of the decomposition level 1.

FIG. 5 is also a schematic diagram for illustrating one example of a concept of a representative "layer" structure. A transformed code block is divided into the sub-bands (1LL, 1HL, 1LH, 1HH), and a wavelet coefficient value is allocated to each sub-band.

It is easy to understand the layer structure, by looking at the wavelet coefficient values from a lateral direction (a bit plane direction). One layer includes an optional number of bit planes. In the present example, each of layers 0, 1, 2, and 3 includes bit planes of 1, 3, 1, 3. Layers including bit planes near the least significant bit (LSB) are first quantized. On the other hand, layers near the most significant bit (MSB) remain unquantized until the last. A method of discarding layers starting from those near the LSB is called a truncation. According to the truncation, a quantization rate can be controlled in detail.

The entropy encoding-and-decoding unit 104 shown in FIG. 1 encodes the tiles 112 of each component 111 by estimating probabilities from the context and the bits. In this way, all components 111 of the original image are encoded in the tile 112. Last, the tag processing unit 105 combines all coded data from the entropy encoding-and-decoding unit 104 into one code string data, and adds tags to this data.

Figure 6:
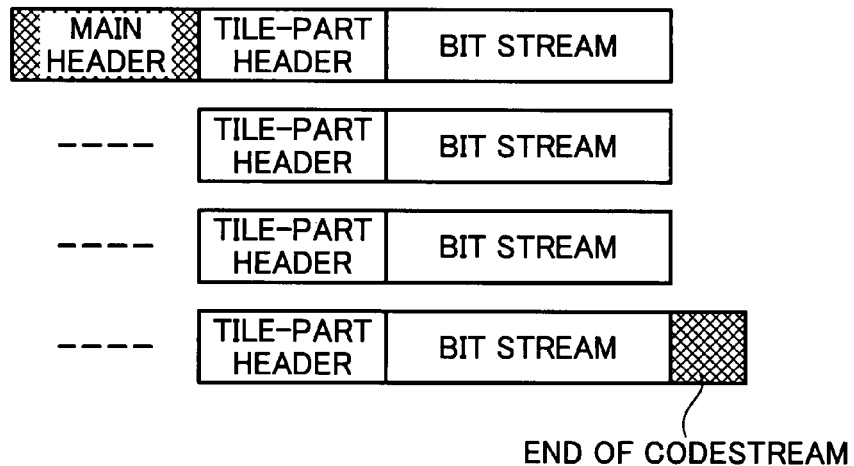
FIG. 6 is a schematic diagram for illustrating a configuration of one frame of encoded string data.
Figure 7:
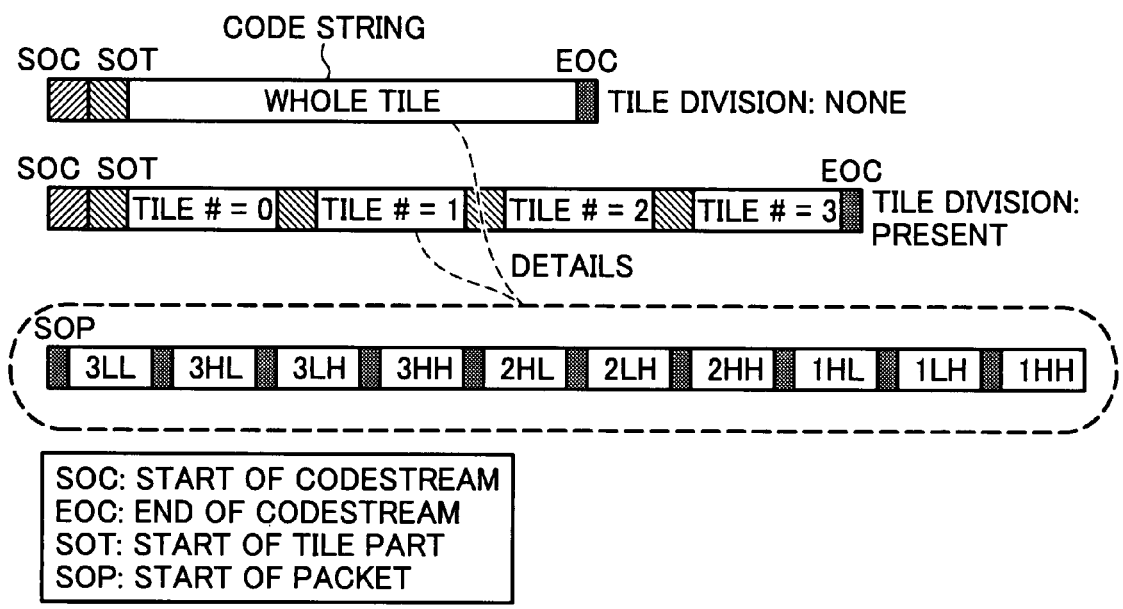
FIG. 7 is a schematic diagram for illustrating a codestream structure displaying in each sub-band a packet accommodating an encoded wavelet coefficient value.

FIG. 6 depicts a schematic configuration of one frame of encoded string data. Tag information called a header (a main header), and a tile-part header as tile boundary position information, is added to the header of the code string data and the header of the coded data (bit stream) of each tile. Coded data of each tile follows this. A coded parameter and a quantized parameter are described in the main header. A tag (end of codestream) is placed again at the end of the code string data. FIG. 7 depicts a codestream structure displaying in each sub-band a packet accommodating an encoded wavelet coefficient value. As shown in FIG. 7, a similar packet string structure is provided both when a file division process is performed and when a tile division process is not performed.

On the other hand, during the decoding of the coded data, image data is generated from code string data of each tile 112 of each component 111, in the order opposite to that of encoding image data. In this case, the tag processing unit 105 interprets the tag information added to the code string data input from the outside, splits the code string data into code string data of each tile 112 of each component 111, and decodes (decompresses) each code string data of each tile 112 of each component 111. In this case, positions of bits to be decoded are determined in the order based on the tag information within the code string data. At the same time, the quantizing and inversely-quantizing unit 103 generates a context from the decoded array of the peripheral bits of the bit positions. The entropy encoding-and-decoding unit 104 decodes by estimating probabilities from this context and the code string data, generates bits, and writes the bits into the bit positions. The decoded data are spatially divided in each frequency band. Therefore, the two-dimensional-wavelet-transforming and inversely-transforming unit 102 performs a two-dimensional wavelet inverse transforming, thereby decoding each tile of each component of the image data. The color-space-transforming and inversely-transforming unit 101 transforms the decoded data into image data of the original display color system.

The above explains the "encoding and decoding algorithm based on the discrete wavelet transform".

Figure 8:
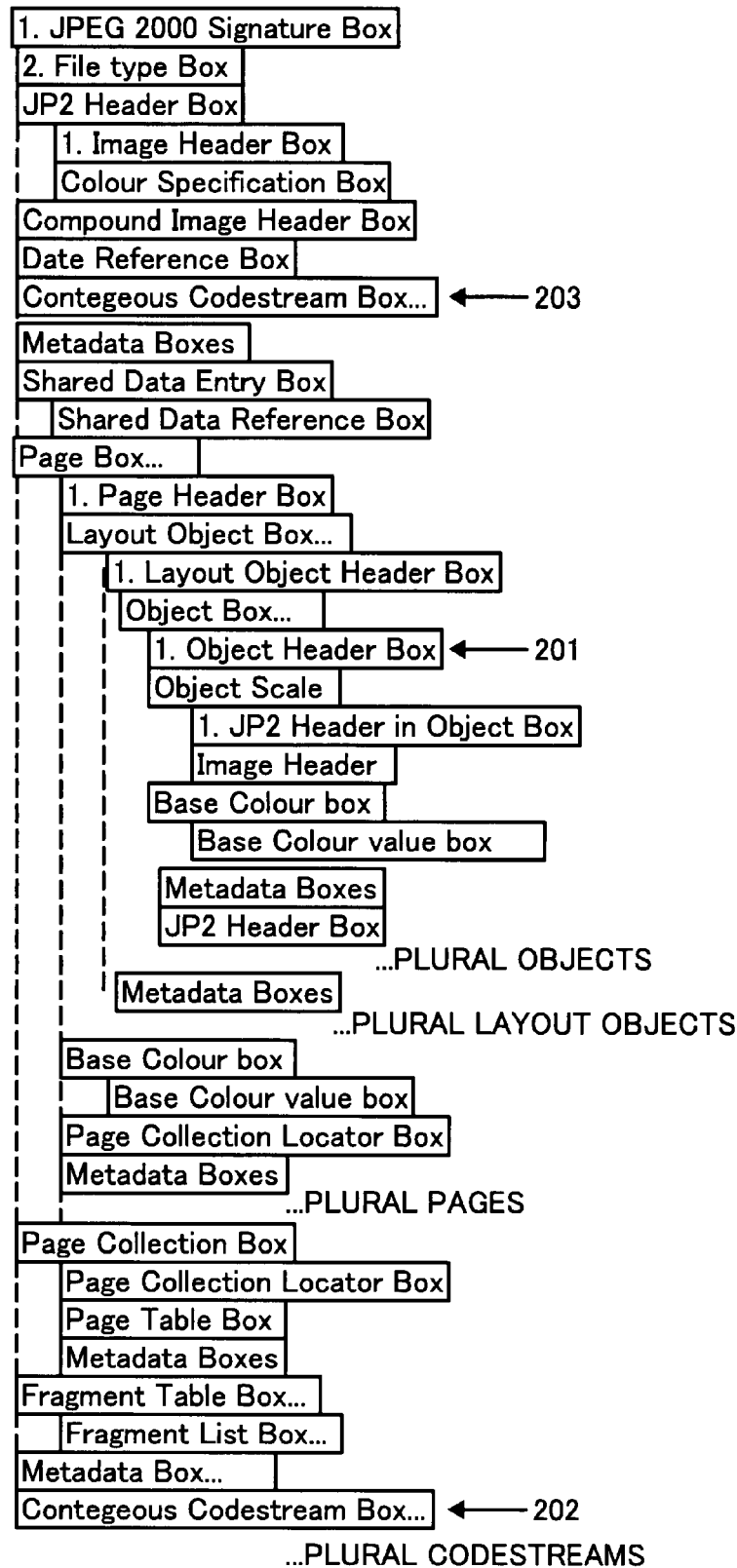
FIG. 8 is a schematic diagram of a data structure of a JPEG Multi-layer (JPM) file.

Part 6 "Compound image file Format" of the JPEG2000 is explained next. Part 6 "Compound image file Format" of the JPEG2000 is a specialized standard of a complex image containing different characteristics of pictures and letters, and is prescribed in the International Standard IS-15444-6 shown in The UNIX Super Text. A file decompression of data of the JPEG2000 determined in Part 6 of the JPEG2000 is "JPM". The JPM (JPEG2000 Multi Layer) file as one example of this structured text includes an Object Header Box 201 into which offset showing a position of a codestream is written, a codestream Box 202 to be referred, and other Box 203, as shown in FIG. 8. In the JPM file, data can be referred, orders of BOX information can be described, and data can be referred using reference numbers instead of position assignment by offset. Regarding a predetermined BOX shown in FIG. 8, it is prescribed that when the level and range are maintained, this file functions as a standard compatible JPM file even when the number of appearance and appearance order change. For example, regarding a codestream of an object within each layout object, it is prescribed that the codestream can be set at an optional position of (1) after the text thumbnail (code 203 in FIG. 8) and (2) at a position of a highest level satisfying a logical structure of the structured text.

Figure 9:
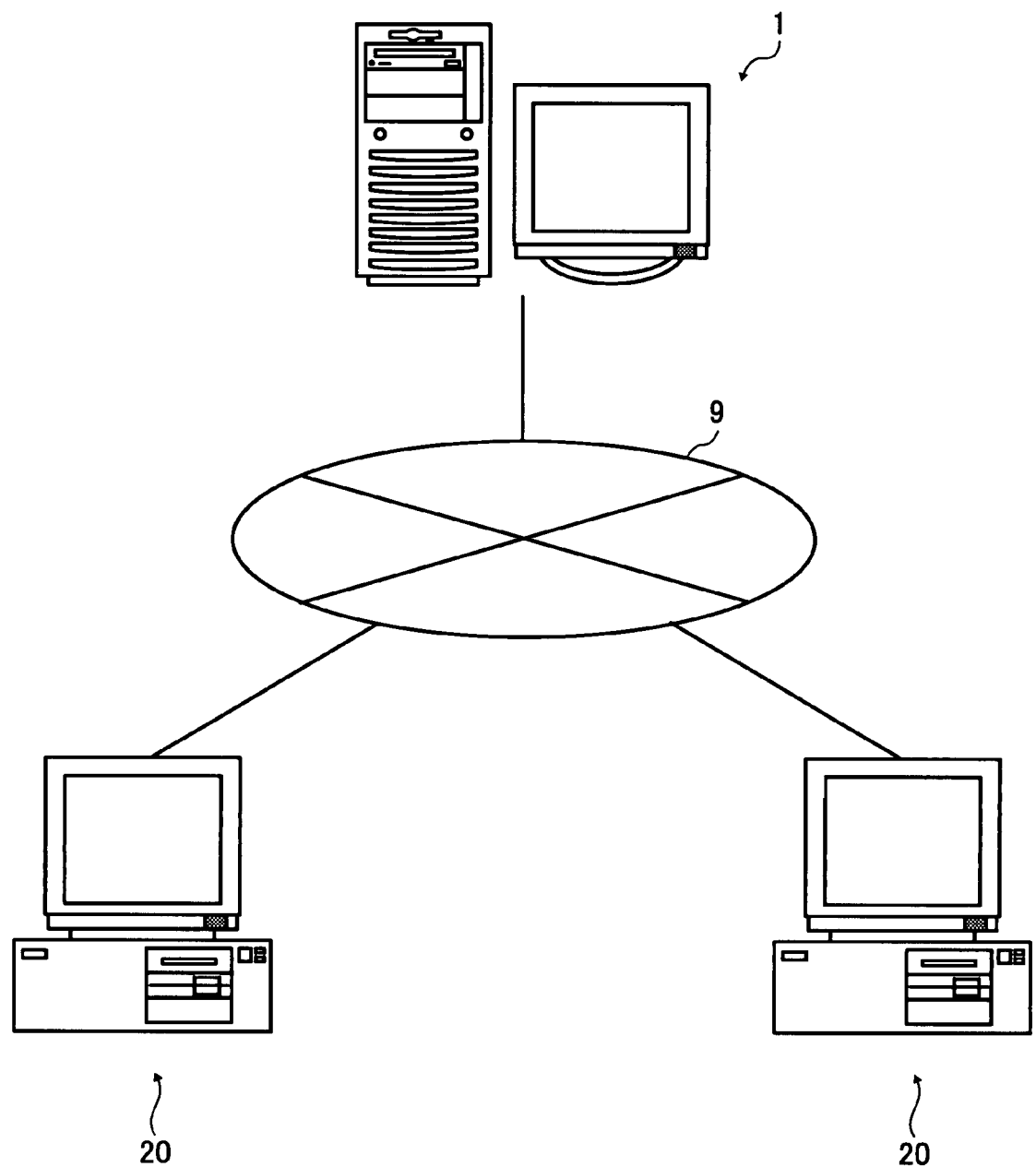
FIG. 9 is a system configuration diagram of an access control system.

Exemplary embodiments of the present invention are described next in detail. FIG. 9 is a system configuration diagram of an access control system to which the present invention is applied. As shown in FIG. 9, the access control system has a configuration that personal computers (hereinafter, clients) 20 used by a secretary, a delivery clerk, and an addressed person are connected to a server computer (hereinafter, a server) 1 storing a scan text in a JPM file coded in a structured document format, via a network 9.

Figure 10:
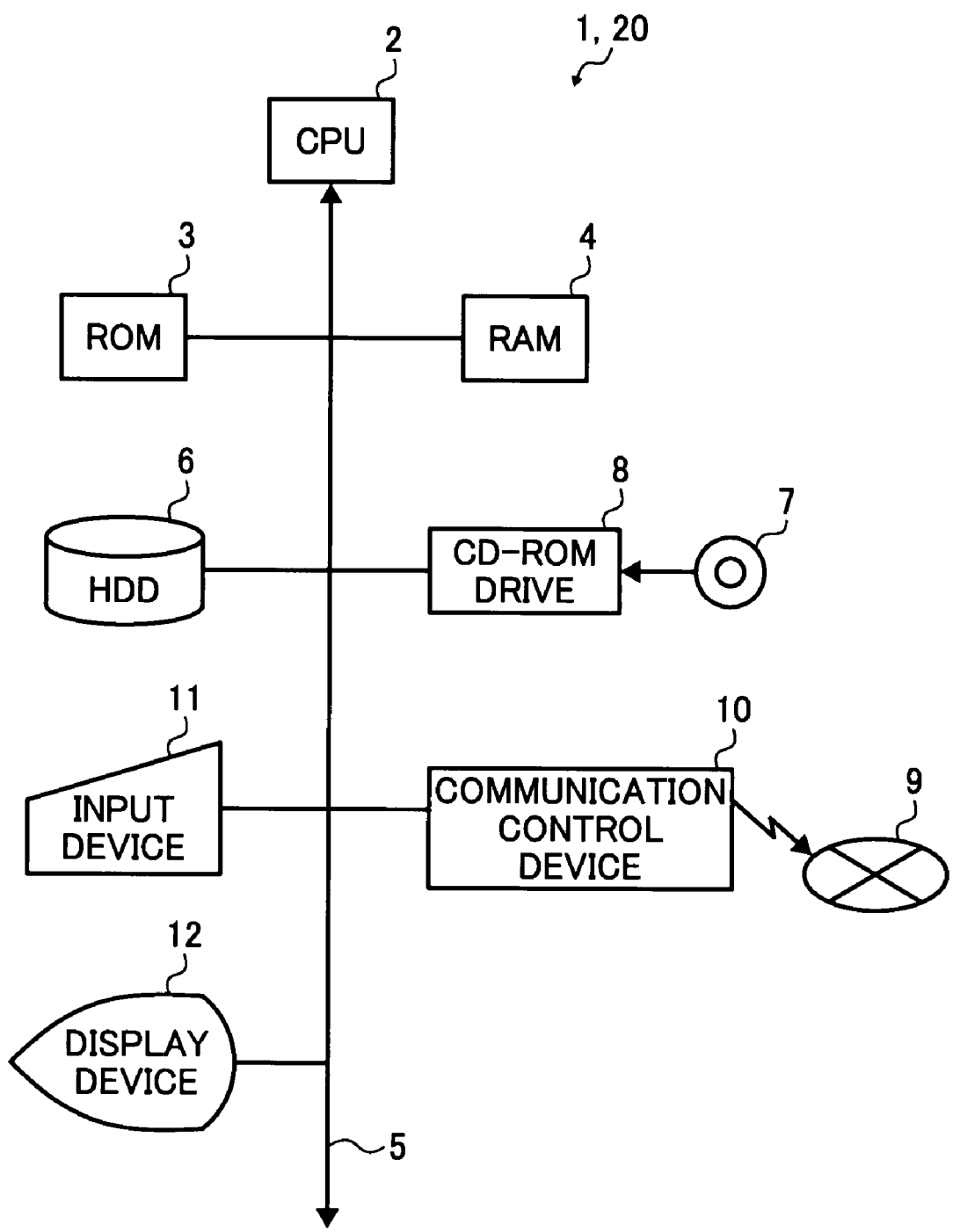
FIG. 10 is a block diagram of a hardware configuration of a server and a client.

FIG. 10 is a block diagram of a hardware configuration of the server 1 and the client 20. The server 1 and the client 20 are mainly configured by a personal computer. As shown in FIG. 10, the server 1 and client 20 include a central processing unit (CPU) 2 as a main part of the computer that integrally controls each part. This CPU 2 is connected to a read only memory (ROM) 3 as an exclusive reading memory storing a basic input/output system (BIOS) and the like, and a random access memory (RAM) 4 that can rewrite various kinds of data, via a bus 5.

The bus 5 is connected, via an I/O unit (not shown), to: a hard disk drive (HDD) 6 storing various kinds of programs; a compact disk (CD)-ROM drive 8 for reading CD-ROM 7 as a mechanism of reading computer software as a distributed program; a communication control device 10 that transmits information by communicating with other external computers via the network 9; an input device 11 such as a keyboard and a mouse for inputting various kinds of instructions and information to the CPU 2; and a display device 12 such as a cathode ray tube (CRT) and a liquid crystal display (LCD) that display a process and a result of processing.

The JPM file, which is a file of various texts being scanned and encoded in a structured document format, is stored in the HDD 6 of the server 1.

The RAM 4 has a characteristic of rewritably storing various kinds of data, and plays the role of a buffer and the like by functioning as a work area of the CPU 2.

The CD-ROM 7 shown in FIG. 10 executes the role of the storage medium according to the present invention, and stores an operating system (OS) and various kinds of programs. The CPU 2 reads programs stored in the CD-ROM 7 with the CD-ROM drive 8, and installs the programs into the HDD 6.

For the storage medium, not only the CD-ROM 7, media of various kinds of systems can be used such as various kinds of optical disks like digital versatile disks (DVDs), various kinds of optical magnetic disks, various kinds of magnetic disks like flexible disks, and various kinds of semiconductor memories. A program can be downloaded from the Internet via the communication control device 10, and can be installed in the HDD 6. In this case, a storage device storing a program in the server at the transmitting side is also a storage medium according to the present invention. The program can be operated in a predetermined operating system (OS). In this case, the OS can play a part of various kinds of processes described later, or the program can be included in a group of program files structuring predetermined application software or an OS.

The CPU 2 that operates the total system is used as a main storage of the system, and executes various kinds of process based on a program loaded on the HDD 6.

Out of the functions that the CPU 2 achieves based on various kinds of programs installed on the HDD 6 of the server 1, characteristic functions held in the server 1 according to the present embodiment are explained.

Figure 11:
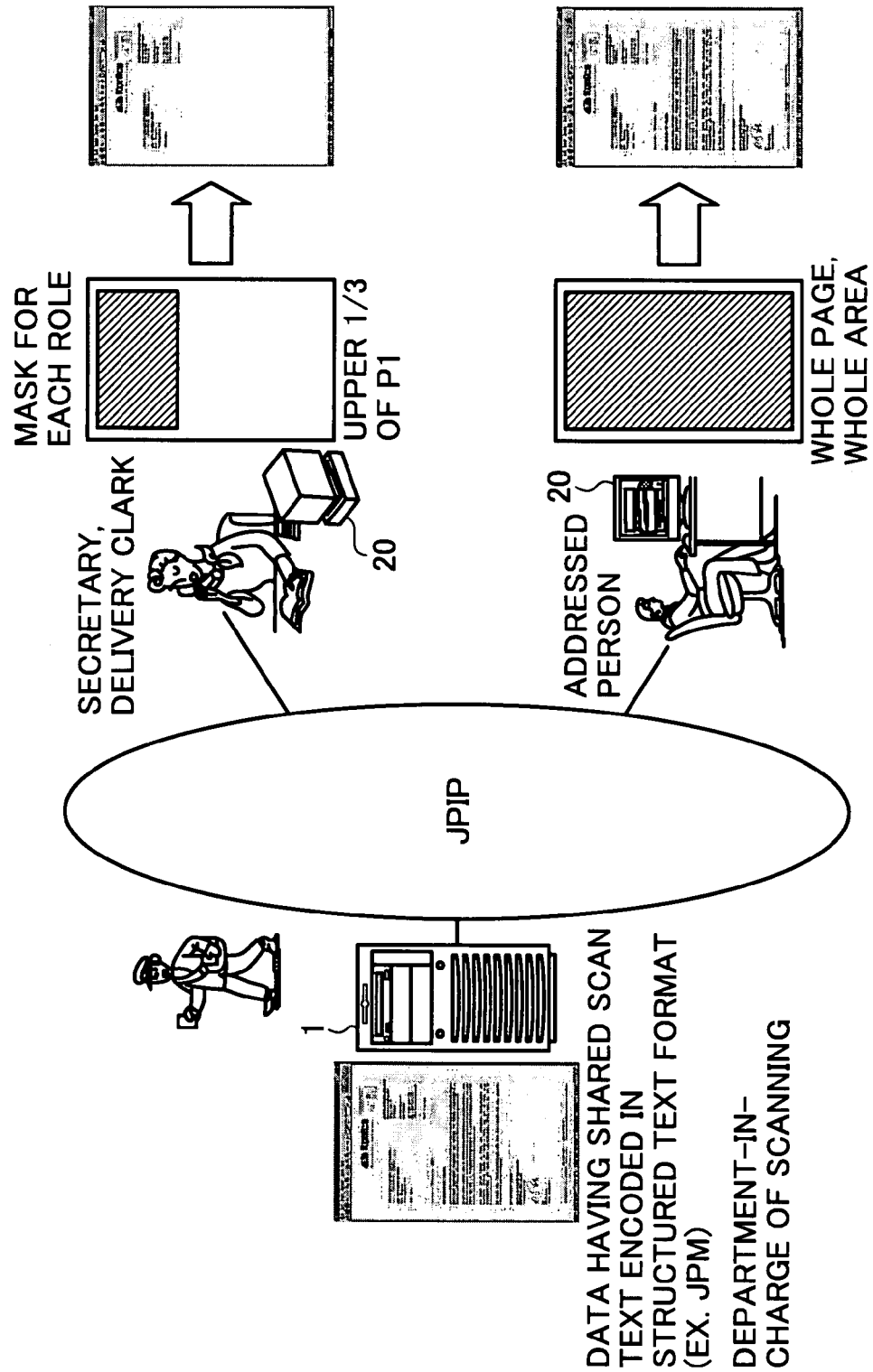
FIG. 11 is a schematic diagram of a processing operation in an access control system.

The processing operation of the access control system is briefly explained. As shown in FIG. 11, it is assumed that an organization includes a scanning unit, a secretary, a delivery clerk, and an addressed person. As shown in FIG. 11, when the addressed person receives a letter from the outside, the scanning unit scans this letter, and stores a JPM file having the letter encoded in a structured document format, into the server 1. The scanning unit informs the addressed person about the arrival of the letter. This system notifies the client 20 used by the secretary and the delivery clerk who deliver a mail to the addressed person about the arrival of the mail (a shared scan text). In this case, when the whole content of the shared scan text can be read by the secretary and the delivery clerk, the mail content can be also read. When the mail content can be read by persons other than the addressed person, this is a problem in the security and privacy embodiment. Therefore, according to the present embodiment, the shared scan text is masked for each role as shown in FIG. 11. With this arrangement, only a header part, in which the addressed person and a sender are described, is controlled to be displayed in the client 20 used by the secretary and the delivery clerk. In other words, information corresponding to the mask is visible.

The secretary and the delivery clerk can watch only the part of the sender and the addressed person of the mail (shared scan text), because of the mask. However, this information is sufficient to notify the addressed person about the arrival of the mail. Accordingly, the secretary and the delivery clerk notify the addressed person about the arrival of the mail.

On the other hand, it is not sufficient that the addressed person can read only the information of the sender and the addressed person such as the secretary and the delivery clerk. The addressed person needs to be able to read all the mail (shared scan text). Therefore, all of the area is masked, and the client 20 used by the addressed person is controlled to enable the addressed person to read the whole mail (the shared scan text) as shown in FIG. 11.

In the present system, the mail (the shared scan text) is not directly transmitted to the secretary, the delivery clerk, and the addressed person as clients, and is stored in the server 1. Only the fact of the arrival of the mail (the shared scan text) is transmitted to the secretary, the delivery clerk, and the addressed person. It can be arranged such that the secretary, the delivery clerk, and the addressed person who receive the notification can read the mail (the shared scan text) in the server I based on a certain protocol. The protocol can be arranged such that only the mail body is transmitted to the addressed person such as the Send Mail Transfer Protocol (SMTP). According to the protocol of the client server format, the shared scan text is transmitted only when access occurs. Based on this structure, access occurs only when the client requires the text. Therefore, traffic that occurs when broadcasting to plural secretaries and delivery clerks having the same role can be scattered. When the JPEG2000 Interactivity Tools, APIs and Protocols (JPIP) are used, it can be structured such that only the part code relevant to the display area of the client 20 is accessed. Therefore, the traffic of the network 9 can be decreased.

According to the present embodiment, the mask for controlling the access is encoded based on multi-valued information (such as the International Standard IS15444-1 (the JPEG2000 basic system)) for controlling the access at stages. When the mask is encoded based on the JPEG2000 basic system, access control can be performed independently to the position of the original image, for each page, for each lateral or vertical area, for each resolution, and for each color written in the original image. At the time of independently accessing the position of the original image, access control is performed for each tile by dividing the access-controlled mask into tiles, or each precinct is independently access controlled by dividing the wavelet transform coefficient into precincts, or by combining these precincts.

When the mask is encoded by the JPEG2000, the mask for controlling the access can control the access independently in a depth direction of the pixels. More specifically, the mask for controlling the access can either independently access control each bit plane or independently access control each sub-bit plane.

The mask for controlling the access is not limited to multi-valued information for controlling the access at stages, and can be encoded following binary information for controlling ON/OFF of the access.

Figure 12:
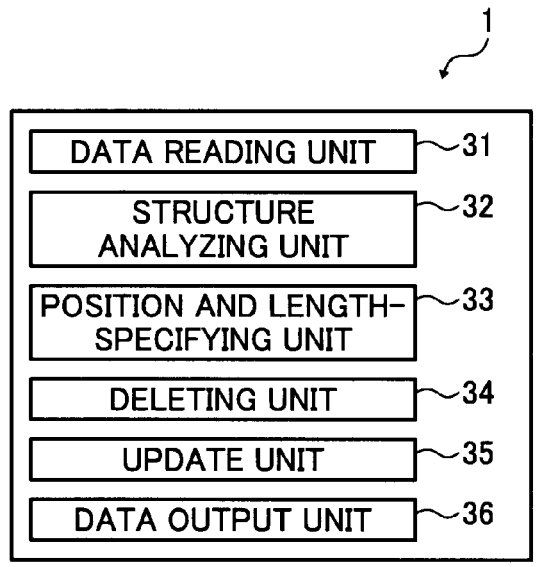
FIG. 12 is a block diagram of a functional configuration relating to "deletion of a mask object" executed by a server.

The outline is as explained above. To perform this process, the three devices including the server 1, the client 20 used by the secretary and the delivering person, and the client 20 used by the addressed person need to perform certain operation. The following points of the present invention to be executed by the three devices are sequentially explained:

(1) Deletion of a mask object
(2) Addition of a mask object
(3) Replacement of a mask object
(4) Execution of a mask object specific to each role of a user The "deletion of a mask object" is a process executed by the server 1. FIG. 12 is a block diagram of a functional configuration relating to the "deletion of a mask object" executed by the server 1. As shown in FIG. 12, the server 1 includes: a data reading unit 31 that reads data; a structure analyzing unit 32 that analyzes the structure of the encoded data; a position and length-specifying unit 33 that specifies a position and a length of a codestream of the mask; a deleting unit 34 that deletes a codestream of the mask; an update unit 35 that updates a part recording a position and a length to refer the codestream of the mask; and a data output unit 36 that outputs data. The deleting unit 34 that deletes the codestream of the mask is not always an essential structure condition, and the same effect can be also obtained from the update unit 35.

Figure 13:
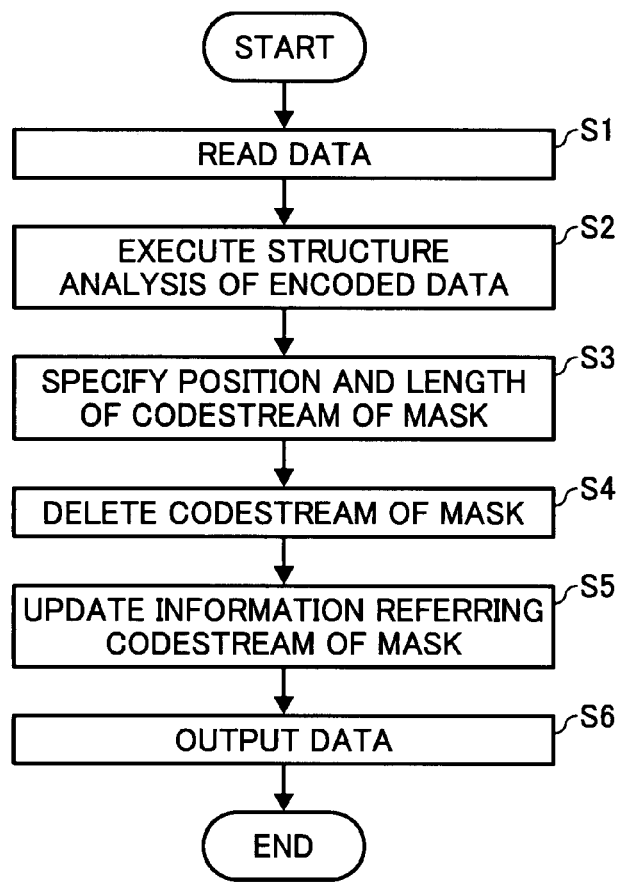
FIG. 13 is a flowchart of a processing flow relating to "deletion of a mask object" executed by the server.

The mask object encoded by the structured document format has a function of switching a value to be rendered to pixels to between a value shown in the foreground and value shown in a background. In the server 1 shown in FIG. 12, the mask object is deleted in the sequence shown in FIG. 13.

First, the server 1 reads encoded data (step S1), executes a structure analysis of the encoded data (step S2), and specifies a position and a length of the codestream corresponding to the mask based on a result of the structure analysis (step S3). The number of the mask is not limited to one within the whole text or within the page, and plural masks are present in general.

The server 1 then deletes the codestream of the mask having a position and a length specified (step S4), and updates the part having the position and the length recorded to refer the mask present in each layout object (step S5). The position of the codestream is determined by "OFFSET", and the length of the codestream is determined by "LENGTH". A target operation can be obtained by only setting LENGTH=0. Therefore, it is not always necessary to update the OFFSET value. The operation of deleting the mask object can be also performed by only setting LENGTH=0 at step S5, without carrying out the operation at step S4. In other words, the update unit 35 can update at least the length "LENGTH" of the codestream of the mask object to a value not normal (for example. LENGTH=0), instead that the deleting unit 34 deletes the codestream of the mask.

The data obtained by having the mask deleted is output at step S6.

The above explains the "deletion of a mask object" performed by the server 1.

Figure 14:
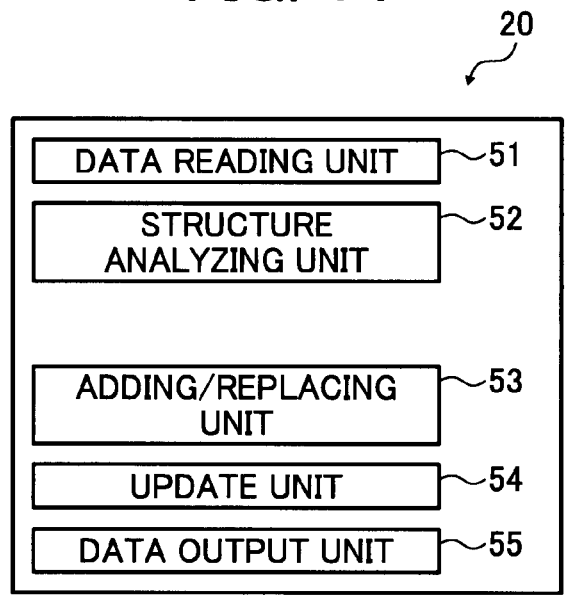
FIG. 14 is a block diagram of a functional configuration relating to "addition of a mask object" and "replacement of a mask object" executed by a client.

The "addition of a mask object" and the "replacement of a mask object" are explained next. The "addition of a mask object" and the "replacement of a mask object" are performed by the client 20. FIG. 14 is a block diagram of a functional configuration relating to the "addition of a mask object" and the "replacement of a mask object" executed by the client 20. As shown in FIG. 14, the client 20 includes: a data reading unit 51 that reads data; a structure analyzing unit 52 that performs the structure analysis of the encoded data; an adding/replacing unit 53 that adds or replaces the codestream of the mask; an update unit 54 that updates information referring the codestream of the mask; and a data output unit 55 that outputs the data.

Figure 15:
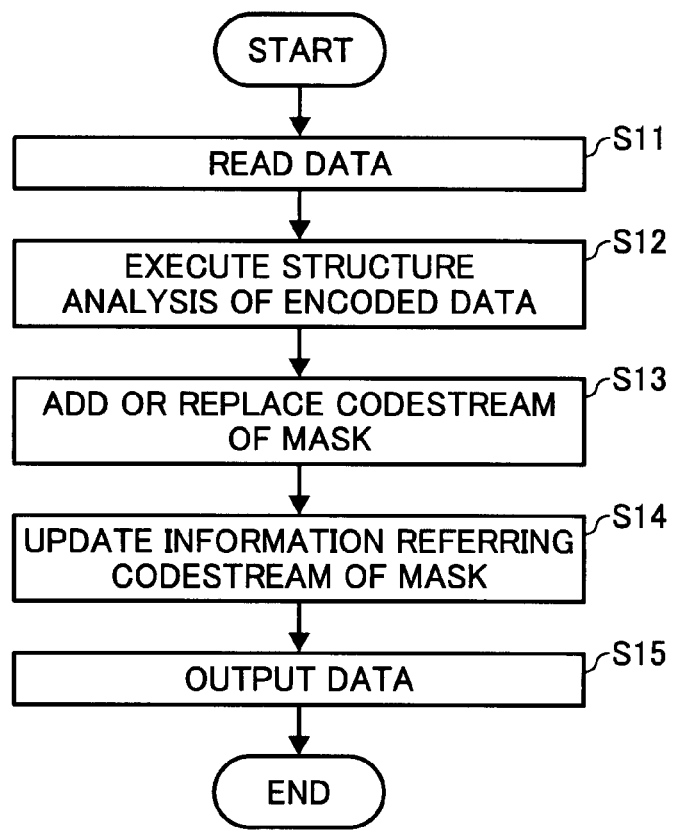
FIG. 15 is a flowchart of a processing flow relating to "addition of a mask object" and "replacement of a mask object" executed by a server.

The client 20 shown in FIG. 14 adds or replaces the mask object in the sequence shown in FIG. 15.

First, the client 20 reads the encoded data (step S11), performs a structure analysis of the encoded data, and confirms the position of header information referring the mask (step S12).

Next, the client 20 adds or replaces a codestream to the mask for each role (step S13), and updates the information referring the codestream of the added or replaced mask (step S14).

Figure 16:
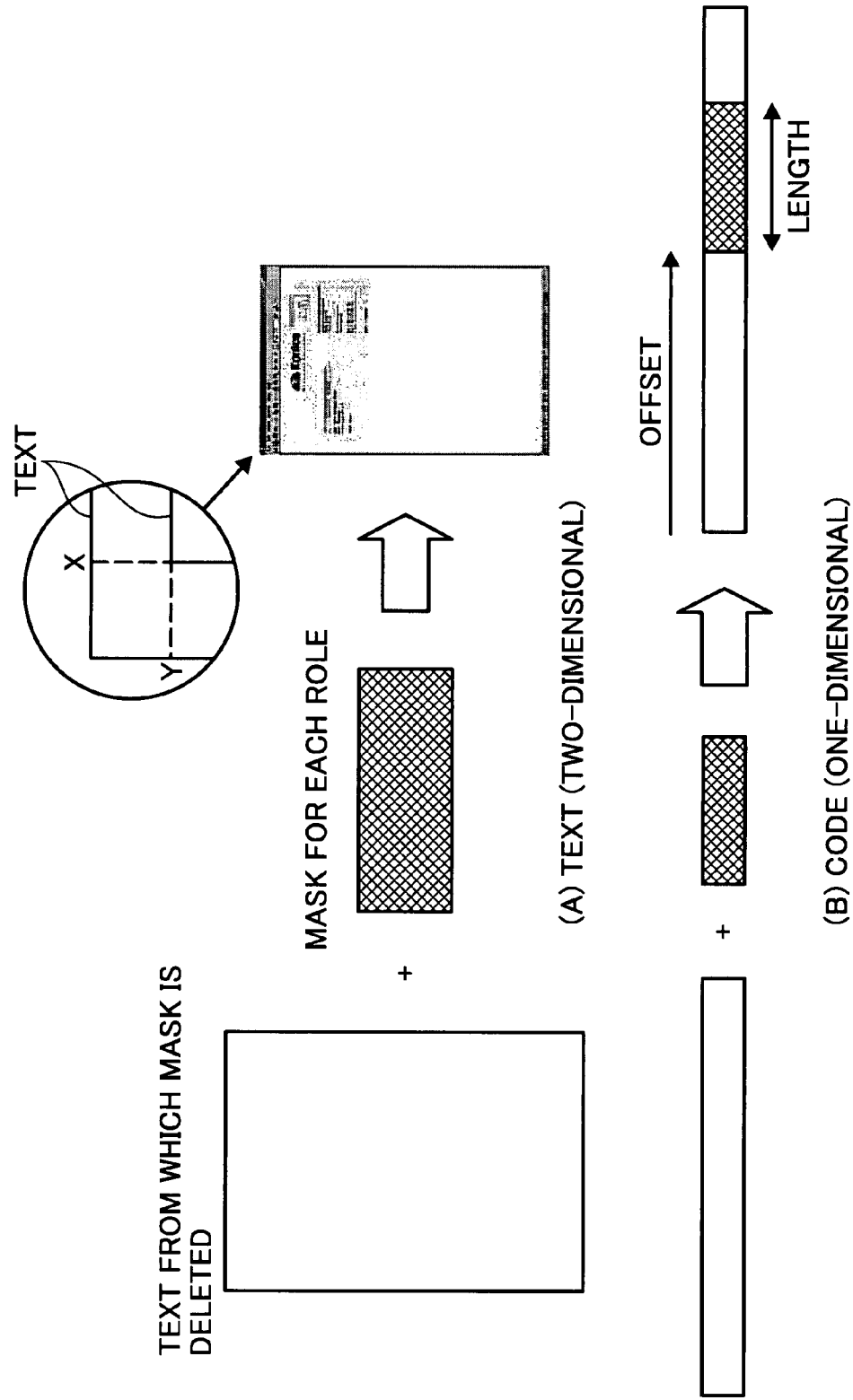
FIG. 16 is a schematic diagram of a relationship between addition of a mask on a code and a rendered image.

This relationship is the concept opposite to that when the server 1 has already deleted the mask. As shown in FIG. 16, a mask for each role is added or replaced in the text in which the mask is deleted, thereby making possible to read the information corresponding to the mask. This state is shown in the two-dimensional text in (a) in FIG. 16, and a relationship of a one-dimensional code is shown in (b) in FIG. 16. As shown in (b) in FIG. 16, a position of the codestream on the one-dimensional code is determined by "OFFSET", and a length of the codestream is determined by "LENGTH".

The "issuing of a mask object specific to each role of a user" is the process executed by the client 20. At the time of starting the application installed in the client 20 used by the secretary, the delivery clerk, and addressed person, a password is input in the log-in screen. After the authentication is performed, a mask is allocated.

Figure 17:
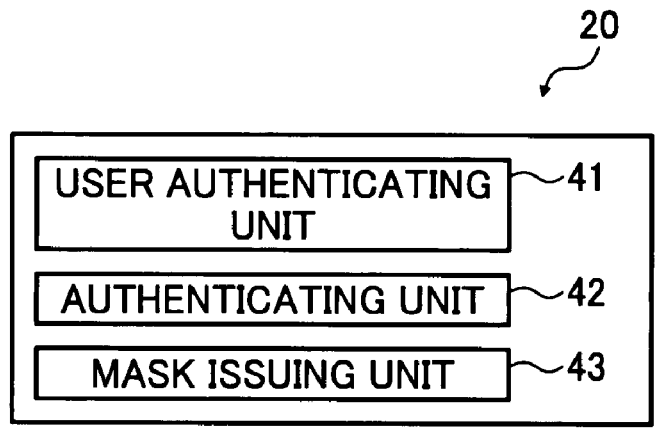
FIG. 17 is a block diagram of a functional configuration relating to the "issuing of a mask object specific to each role of a user" executed by the client.

FIG. 17 is a block diagram of a functional configuration relating to the "issuing of a mask object specific to each role of a user" executed by the client 20. As shown in FIG. 17, the client 20 includes a user authenticating unit 41 that authenticates that a user is an eligible user, an authenticating unit 42, and a mask issuing unit 43.

The authenticating unit 42 functions as a user authenticating unit, and authenticates an organizational role, a name, and an authority of a user to control the mask to display the mail (the shared scan text) stored in the server 1.

Figure 18:
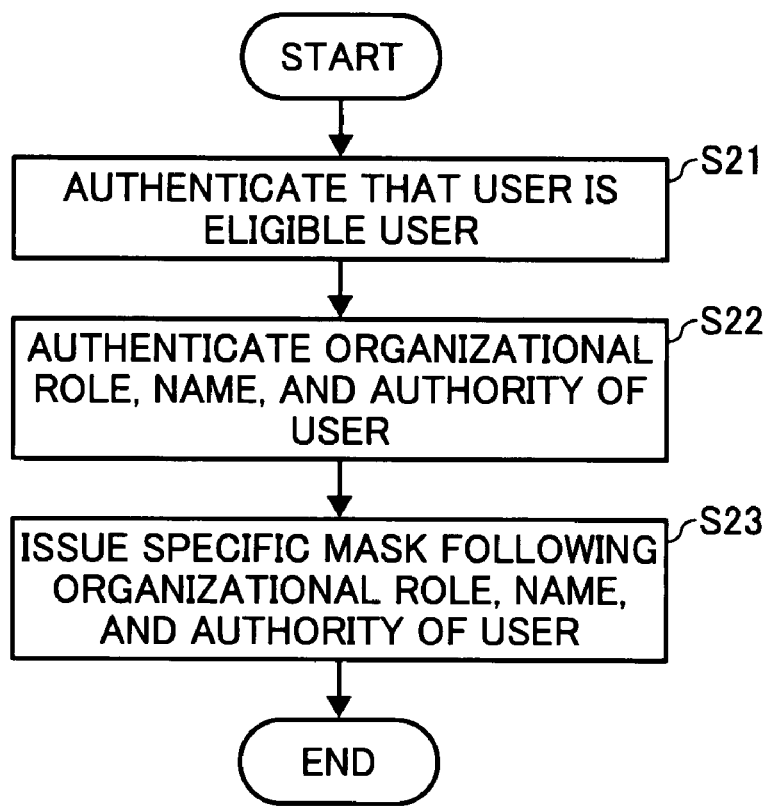
FIG. 18 is a flowchart of a process relating to the "issuing of a mask object specific to each role of a user" executed by the client.

The mask issuing unit 43 controls the issuing of the mask, based on a result of authenticating an organizational role, a name, and an authority of a user by the authenticating unit 42. For example, when the user is the client 20 of the secretary and the delivery clerk, the mask issuing unit 43 controls the mask to display only the parts of the sender and the addressed person. When the user is the client 20 of the addressed person, the mask issuing unit 43 controls the mask to display all parts. In this way, the mask issuing unit 43 processes corresponding to the attribute (role) of the client 20. The control procedure is shown in FIG. 18.

First, the mask issuing unit 43 authenticates that a user is the eligible user (step S21), and authenticates an organizational role and a naming authority of the user (step S22). Last, the mask issuing unit 43 issues a specific mask following the organizational role, the name, and the authority of the user (step S23).

The operation of the access control system including the server 1 and the two clients 20 is explained with reference to FIG. 19.

Figure 19:
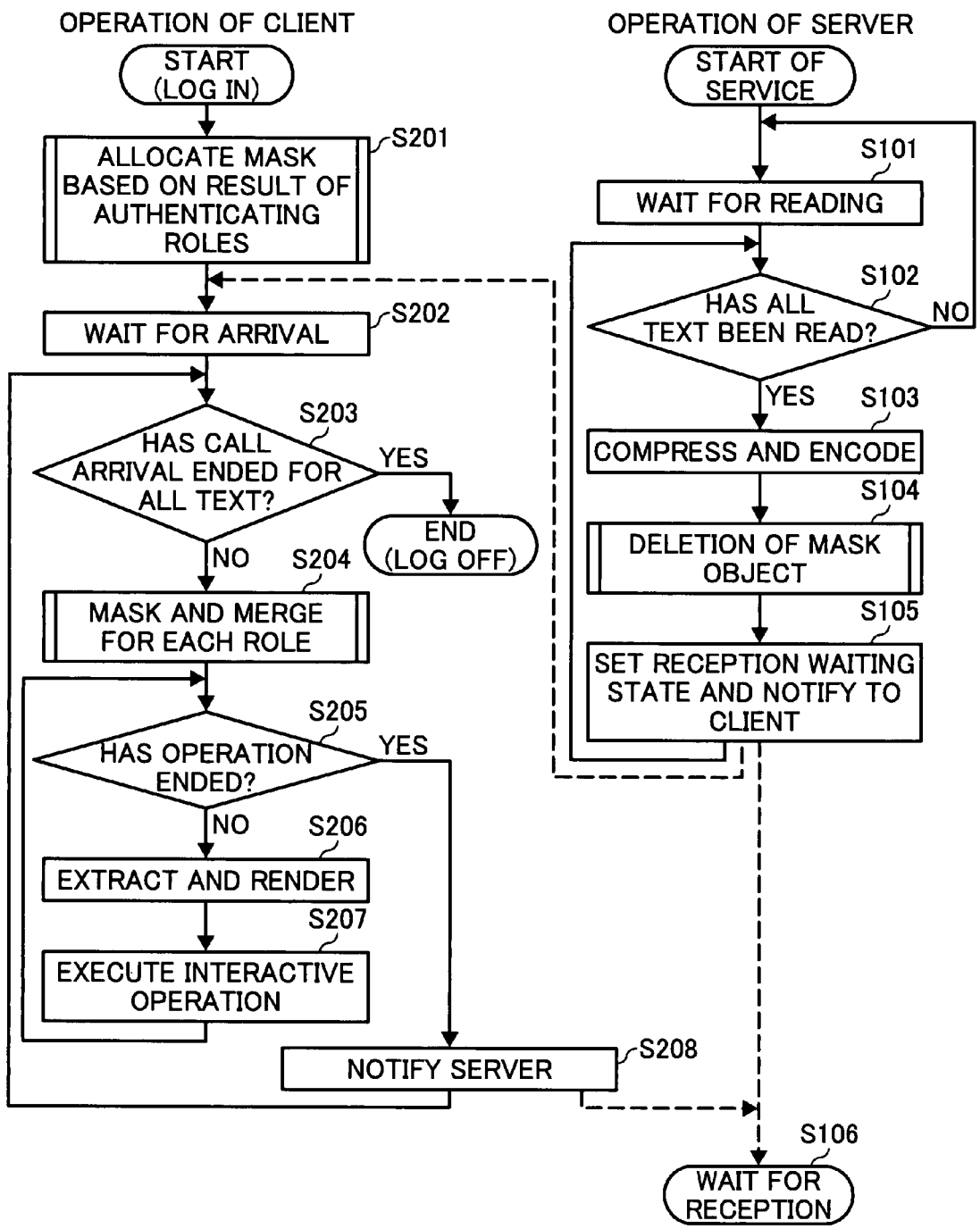
FIG. 19 is a flowchart of a process in an access control system.

As shown in FIG. 19, the server 1 starts service, and waits for reading a text (step S101). The scanning unit reads a text image, checks that all text has been read (YES at step S102), performs a compressed coding in a structured document format (step S103), and deletes the mask object (step S104).

In the present operation, the structure analyzing unit 32 performs the structure analysis of data prepared at step SI 03, and specifies a position and a length following the position and length-specifying unit 33 from the header information written in the data. The deleting unit 34 deletes the mask object. While the deletion of the mask object is explained above, the codestream itself of the mask object does not need to be deleted by only setting the parameter showing the length to zero. It is needless to mention that the above are all within the range of the present invention.

Next, the server 1 is set to the reception waiting state, and notifies this to the client 20 (step S105). At step S102, the server 1 similarly performs the operation to the next text at steps S103 to S105. The server 1 waits for the reception from the client 20 (step S106). When all texts are processed at step S102, the server 1 waits for reading the next text (step S101), and waits for the reading of the text.

On the other hand, when the client 20 used by the secretary and the delivery clerk logs in, the client 20 allocates masks based on a result of authenticating the organizational role, the name, and the authority of the user (step S201), as shown in FIG. 17. Specifically, as shown in FIG. 17, the user authenticating unit 41 authenticates that a user is the eligible user registered in advance in the organization. The authenticating unit 42 then authenticates the organizational role, the name, and the authority of the user. For example, assume that the organization role and the name are registered as the Secretary department, Yamada, mask 1, in the client 20. When "Yamada" personally logs in, this person is authenticated as the legitimate user. In other cases, the authentication is rejected, and the mask issuing unit 43 allocates the "mask 1" to this user. The "mask 1" can be different for each user or can be the same. It is needless to mention that the mask can be common to the same organization role and the same group.

According to the present embodiment, while the format of locally allocating a mask inside each client 20 is explained, it is needless to mention that the following is also included in the range of the present invention, that is, a common server (not shown) present in the network 9 identifies the role and the authority of each user from the viewpoint of the total organization, and issues the mask corresponding to this identification.

In this state, the client 20 waits for a call arrival. The client 20 performs a call arrival notification corresponding to the notification from the server 1 to the client 20 (step S202), and when call arrival ends for all texts (YES at step S203), the client 20 merges the data obtained from the server 1 and the mask allocated at step S201 (step S204).

The merge process is the operation of entering a mask from the left upper side (the origin) to the offset (x, y) position in the main scan direction and the sub-scan direction, in the corresponding page, as shown in the two-dimensional text in (a) in FIG. 16. Specifically, the mask allocated by the data reading unit 31 at step S201, and the "data from which a mask is deleted" by the server 1 at step S104 are read. Next, the structure analyzing unit 52 performs a structure analysis of the data from which the mask is deleted, and specifies a position (a header address OFFSET) to which the codestream of the mask can be added. The adding/replacing unit 53 then adds the mask allocated with a length shown by LENGTH to the "data from which the mask is deleted". To refer the added mask data, a layout object to be rendered to the above position (x, y) is defined. The update unit 54 enters OFFSET and LENGTH to refer the added mask, and the data output unit 55 outputs the file to refer the mask for each added role.

The operation at step S204 is explained above in the system of merging the mask. When the function of referring the external data is defined in the encoding system at the server 1 side at step S103, it is not always necessary to merge the mask. It is needless to mention that when the update unit 54 updates the mask for each role of the user in the format of the Universal Resource Identifier (URI) that can uniquely specify the mask in the network 9, the adding/replacing unit 53 can be omitted. These are all within the range of the present invention.

The structured text is compatible with the text compressed and encoded by the server 1 at step S103. Therefore, a corresponding decompressor decompresses and renders the text (NO at step S205, and step S206), and draws the text in the client 20.

At step S207, the client 20 suitably executes an interactive operation such as panning and zooming to the image rendered at step S206. The operation at steps S206 to S207 is repeatedly performed until when the user as the secretary and the delivery clerk understands the addressed person. In the case of the above JPIP, the operation of decompression and rendering occurs at step S206 for the user to occasionally fetch the partial codes corresponding to the display area from the server 1 by panning and zooming. The operation at step S206 is not necessary in the File Transfer Protocol (FTP) of accessing all data prepared by the server 1 at step S103. These are all within the range of the present invention.

When the interactive operation ends at step S205, that is, when the user as the secretary and the delivery clerk understands the addressed person (YES at step S205), the process proceeds to step S208. The client 20 notifies the server 1 to notify the user assigned by the addressed person. The process returns to step S203, and the client 20 repeats the operation at steps S204 to S208 until when it is determined that call arrival ends for all texts (YES at step S203).

On the other hand, when the client 20 used by the addressed person has already logged in, the client 20 is also allocated with a mask for each role at step S201, like the secretary and the delivery clerk. A call arrival notification reaches the client 20 from the server 1 (step S202), and the client 20 merges the data obtained from the server 1 and the mask allocated at step S201 (step S204). The addressed person is set with the mask to be able to read the whole text. Therefore, the whole text is drawn in the client 20, unlike the text displayed in the client used by the secretary and the delivery clerk. After the client 20 performs the interactive operation at step S207, the client 20 notifies the server 1 to store or discard the text at step S208. The server 1 executes the notified operation. The operation of the present invention ends there.

As explained above, according to the present embodiment, the server deletes a mask object in the structured text as a part of the shared text. Depending on the authority of the user of the client, the client issues the mask object structuring each layout object of the structured text. The client adds the mask object to the shared text data from which the mask object received from the server is deleted. With this arrangement, information written in the shared text is made unreadable according to the authority of the user of the client. As a result, access control to a part of the shared text can be achieved.

According to one embodiment, the client issues a mask object structuring each layout object of the structured text according to the authority of the user of the client. The client replaces the mask object of the shared text data received from the server with the issued mask object. With this arrangement, information written in the shared text is made unreadable according to the authority of the user of the client. As a result, access control to a part of the shared text can be achieved.

According to one embodiment, the scan text stored by the server 1 is the JPM file as the structured text according to the International Standard IS15444-6 (JPM system). However, the text is not limited to the above, and a structured text following the Portable Document Format (PDF) by Adobe Systems Incorporated can be also used.

According to one embodiment of the present invention, the server deletes the mask object in the structured text as a part of the shared text. The client issues a mask object structuring each layout object of the structured text according to the authority of the user of the client, and adds this mask object to the shared text data from which the mask object received from the server is deleted. With this arrangement, the client sets the information written in the shared text unreadable according to the authority of the user of the client. As a result, access control to a part of the shared text can be achieved.

According to one embodiment of the present invention, the server updates at least the length of the codestream of the mask object in the structured text as a part of the shared text, to a value not normal. The client issues a mask object structuring each layout object of the structured text according to the authority of the user of the client, and adds this mask object to the shared text data from which the mask object received from the server is deleted. With this arrangement, the client sets the information written in the shared text unreadable according to the authority of the user of the client. As a result, access control to a part of the shared text can be achieved.

According to one embodiment of the present invention, the client issues a mask object structuring each layout object of the structured text according to the authority of the user of the client, and replaces the mask object of the shared text data received from the server with the issued mask object. With this arrangement, the client sets the information written in the shared text unreadable according to the authority of the user of the client. As a result, access control to a part of the shared text can be achieved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system comprising:
   a server to store therein shared text data encoded in a structured document format, and that is connected to a plurality of clients, the server comprising:
   a structure analyzing unit to perform structure analysis of the shared text data;
   a position-and-length specifying unit to specify a position and a length of a codestream of a mask object structuring each layout object of a structured text based on a result of the structure analysis of the shared text data;
   a deleting unit to delete the codestream of the mask object;
   an updating unit to update reference information of the shared text data to refer the codestream of the mask object deleted by the deleting unit; and
   an outputting unit to output the shared text data updated by the updating unit to an access-requested client; and
   the access-requested client that is connected to the server and that observes the shared text data encoded in a structured document format stored in the server, the access-requested client comprising:
   an authenticating unit to check authority of a user;
   a mask issuing unit to issue a mask object constituting each layout object of a shared text according to the authority of the user;
   a structure analyzing unit to perform structure analysis of the shared text data from which the codestream of the mask object received from the server is deleted;
   an adding unit to add the codestream of the mask object issued by the mask issuing unit to the shared text data from which the codestream of the mask object received from the server is deleted based on a result of the structure analysis;
   a client updating unit to update reference information of the shared text data to refer the codestream of the mask object added by the adding unit; and
   a client outputting unit to output the shared text data updated by the client updating unit.

2. The server according to claim 1, wherein the reference information is a position of the codestream of the mask object from the header of the file and a length of the codestream of the mask object.

3. The server according to claim 1, wherein shared text data encoded in the structured document format is a file prescribed by the International Standard IS15444-6.

4. A system comprising:
   a server that stores therein shared text data encoded in a structured document format, and that is connected to a plurality of clients, the server comprising:
   a structure analyzing unit to perform structure analysis of the shared text data;
   a position-and-length specifying unit to specify a position and a length of a codestream of a mask object structuring each layout object of a structured text based on a result of the structure analysis;
   an updating unit to update at least a length of the codestream of the mask object; and
   an outputting unit to output the shared text data updated by the updating unit to an access-requested client; and
   the access-requested client that is connected to the server and that observes shared text data encoded in a structured document format stored in the server, the access-requested client comprising:
   an authenticating unit to check authority of a user;
   a mask issuing unit to issue a mask object constituting each layout object of a shared text according to the authority of the user;
   a structure analyzing unit to perform structure analysis of the shared text data from which the codestream of the mask object received from the server is deleted;
   an adding unit to add the codestream of the mask object issued by the mask issuing unit to the shared text data from which the codestream of the mask object received from the server is deleted based on a result of the structure analysis;
   a client updating unit to update reference information of the shared text data to refer the codestream of the mask object added by the adding unit; and
   a client outputting unit to output the shared text data updated by the client updating unit.

5. The server according to claim 4, wherein the reference information is a position of the codestream of the mask object from the header of the file and a length of the codestream of the mask object.

6. The server according to claim 4, wherein shared text data encoded in the structured document format is a file prescribed by the International Standard IS15444-6.

7. A method of storing shared text data encoded in a structured document format in a server that is connected to a plurality of clients and observing the shared text data encoded in the structured document format stored in the server from a client, the method comprising:

performing a structure analysis of the shared text data;

specifying a position and a length of a codestream of a mask object structuring each layout object of a structured text based on a result of the structure analysis of the shared text data;

deleting the codestream of the mask object;

updating reference information of the shared text data to refer the deleted codestream of the mask object;

outputting updated shared text data to an access-requested client;

checking authority of a user;

issuing the mask object constituting each layout object of a shared text according to the authority of the user;

performing structure analysis of the shared text data from which the codestream of the mask object received from the server is deleted;

adding the codestream of the mask object issued at the issuing to the shared text data from which the codestream of the mask object received from the server is deleted based on a result of the structure analysis;

updating reference information of the shared text data to refer the added codestream of the mask object; and outputting updated shared text data.

8. The method according to claim 7, wherein the reference information is a position of the codestream of the mask object from the header of the file and a length of the codestream of the mask object.

9. The method according to claim 7, wherein shared text data encoded in the structured document format is a file prescribed by the International Standard IS15444-6.

10. A method of storing shared text data encoded in a structured document format in a server that is connected to a plurality of clients and observing the shared text data encoded in the structured document format stored in the server from a client, the method comprising:

performing structure analysis of the shared text data;

specifying a position and a length of a codestream of a mask object structuring each layout object of a structured text based on a result of the structure analysis;

updating at least a length of the codestream of the mask object;

outputting the updated shared text data;

checking authority of a user;

issuing the mask object constituting each layout object of a shared text according to the authority of the user;

performing structure analysis of the shared text data from which the codestream of the mask object received from the server is deleted;

adding the codestream of the mask object issued at the issuing to the shared text data from which the codestream of the mask object received from the server is deleted based on a result of the structure analysis;

updating reference information of the shared text data to refer the added codestream of the mask object; and outputting updated shared text data.

11. The method according to claim 10, wherein the reference information is a position of the codestream of the mask object from the header of the file and a length of the codestream of the mask object.

12. The method according to claim 10, wherein shared text data encoded in the structured document format is a file prescribed by the International Standard IS15444-6.

* * * * *